(No Model.)
E. F. GARLAND.
COVERING FOR ELECTRIC CABLES.
No. 403,262. Patented May 14, 1889.
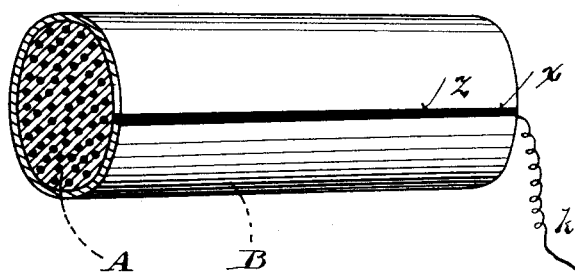
Fig. 1.
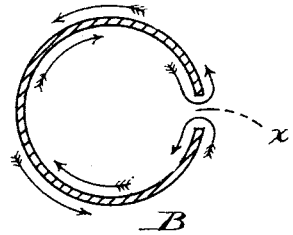
Fig. 2.
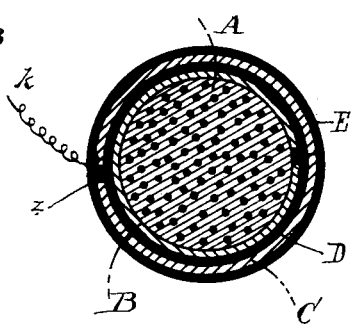
Fig. 3.
Fig. 4.
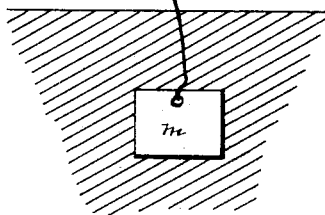
WITNESSES:
Robt W. Matthews
E. W. Spinney
INVENTOR:
Eben F. Garland,
PER C. A. Shaw & Co.
ATT'YS.
N. PETERS, Photo-Lithographer, Washington, D. C.

UNITED STATES PATENT OFFICE.

EBEN F. GARLAND, OF LYNN, ASSIGNOR OF ONE-HALF TO SOLOMON H. HOLBROOK, OF SALEM, MASSACHUSETTS.

COVERING FOR ELECTRIC CABLES.

SPECIFICATION forming part of Letters Patent No. 403,262, dated May 14, 1889.

Application filed February 28, 1888. Serial No. 265,630. (No model.)

*To all whom it may concern:*

Be it known that I, EBEN F. GARLAND, of Lynn, in the county of Essex, State of Massachusetts, have invented a certain new and useful Improvement in Covering for Electric Cables, of which the following is a description sufficiently full, clear, and exact to enable any person skilled in the art or science to which said invention appertains to make and use the same, reference being had to the accompanying drawings, forming part of this specification.

The inclosing covering or pipe of an electric cable for underground lines usually consists of a solid metallic tube, which has a tendency to react upon the latter in such manner as to confuse the currents passing through the wires.

The object of this invention is to provide a tube completely inclosing the cable and in which such induced currents are avoided.

In the accompanying drawings, Figure 1 is a perspective view of an electric cable provided with an inclosing-tube embodying my improvements. Fig. 2 is a transverse section of said inclosing-tube, the wires and the insulating material which completes the tube being omitted. Figs. 3 and 4 are views showing modifications of my improvement.

Similar letters of reference indicate corresponding parts in the different figures.

In the drawings, A represents an ordinary electric cable, and B the inclosing-pipe therefor.

The pipe B is preferably composed of lead, and is slit longitudinally and its edges separated by an insulating-strip, $z$, composed of water-proof material, such as paraffine, tarred paper, or its equivalent. This insulating-strip prevents the formation of induced spiral currents in the pipe. In Fig. 4 the insulating-strip is shown as disposed between the overlapping edges of the slit tube; and in Fig. 1 the insulating-strip is disposed in a slot, $x$, formed between the slit edges of the pipe, which neither meet nor overlap.

In the form shown in Fig. 3 the cable A is inclosed in the pipe B, having the opening $x$, said opening being filled with the insulating-strip and said pipe being completely covered or surrounded with an insulating-layer, D, composed of tarred paper or hemp coated with paraffine or other suitable insulating matter. The pipe so covered is then inclosed in another metallic pipe, C, which is also slit longitudinally and its slit edges separated by an insulating-strip, $z$. The outer tube, C, is surrounded by a coating, E, of insulating material, and is connected with the ground at intervals by means of a wire, $k$, and ground-plate $m$, which grounds any induction-currents produced from electric-light wires or like causes.

I claim—

1. The combination of an electric cable and a metallic pipe inclosing said cable, said pipe being slit longitudinally and its slit edges separated from each other by a water-proof strip of insulating material.

2. The combination of an electric cable, a metallic pipe inclosing said cable, said pipe being slit longitudinally and its slit edges separated from each other by a water-proof strip of insulating material, a coating of insulating material surrounding said pipe, and a second pipe of larger diameter inclosing said coated pipe, said second pipe being also slit and having its slit edges insulated and an insulating covering surrounding said outer pipe.

EBEN F. GARLAND.

Witnesses:
   C. A. SHAW,
   O. M. SHAW.